(12) United States Patent
Johnson et al.

(10) Patent No.: US 9,828,285 B2
(45) Date of Patent: Nov. 28, 2017

(54) TRANSFER OF MONOLAYER GRAPHENE ONTO FLEXIBLE GLASS SUBSTRATES

(71) Applicant: CORNING INCORPORATED, Corning, NY (US)

(72) Inventors: Benedict Yorke Johnson, Horseheads, NY (US); Xinyuan Liu, Painted Post, NY (US); Prantik Mazumder, Ithaca, NY (US); Kamal Kishore Soni, Painted Post, NY (US); Tonglai Chen, Barcelona (ES); Miriam Marchena, Barcelona (ES); Valerio Pruneri, Barcelona (ES)

(73) Assignees: Corning Incorporated, Corning, NY (US); ICFO—THE INSTITUTE OF PHOTONIC SCIENCES, Castelldefelts (ES); INSTITUCIÓ CATALANA DE RECERCA I ESTUDIS AVANÇATS (ICREA), Barcelona (ES)

( * ) Notice: Subject to any disclaimer, the term of this patent is extended or adjusted under 35 U.S.C. 154(b) by 0 days.

(21) Appl. No.: 14/971,163

(22) Filed: Dec. 16, 2015

(65) Prior Publication Data

US 2016/0176755 A1 Jun. 23, 2016

Related U.S. Application Data

(60) Provisional application No. 62/095,270, filed on Dec. 22, 2014.

(51) Int. Cl.
*H01L 21/302* (2006.01)
*C03C 15/00* (2006.01)
(Continued)

(52) U.S. Cl.
CPC .......... *C03C 15/00* (2013.01); *C01B 31/0484* (2013.01); *C03C 17/002* (2013.01); *C03C 17/22* (2013.01); *C03C 2218/31* (2013.01)

(58) Field of Classification Search
CPC ....... C03C 15/00; C03C 17/002; C03C 17/22; H01L 21/30604; H01L 21/30608; C01B 31/0484
(Continued)

(56) References Cited

U.S. PATENT DOCUMENTS 8,409,450 B2 * 4/2013 Zettl ............... B81C 99/008
216/40
8,603,608 B2 * 12/2013 Shin ............... C23C 16/26
428/172

(Continued)

FOREIGN PATENT DOCUMENTS

WO 2011046775 4/2011

OTHER PUBLICATIONS

International Search Report of the International Searching Authority; PCT/US2015/066027; dated Apr. 26, 2016; 5 Pages.
(Continued)

*Primary Examiner* — Lan Vinh (57) ABSTRACT

Described herein are methods for improved transfer of graphene from formation substrates to target substrates. In particular, the methods described herein are useful in the transfer of high-quality chemical vapor deposition-grown monolayers of graphene from metal, e.g., copper, formation substrates to ultrathin, flexible glass targets. The improved processes provide graphene materials with less defects in the structure.

20 Claims, 6 Drawing Sheets

PMMA: Poly(methyl methacrylate
NMP: *N*-methyl-2-pyrrolidone (51) Int. Cl.
*C03C 17/22* (2006.01)
*C03C 17/00* (2006.01)
*C01B 31/04* (2006.01)

(58) Field of Classification Search
USPC .................. 438/745, 750, 751, 752, 754
See application file for complete search history.

(56) References Cited

U.S. PATENT DOCUMENTS

| | | | |
|---|---|---|---|
| 8,916,013 B2* | 12/2014 | Hong | B82B 3/0076 |
| | | | 156/239 |
| 8,916,057 B2 | 12/2014 | Hong et al. | |
| 9,388,048 B1* | 7/2016 | Zhou | C01B 31/04 |
| 2008/0078424 A1* | 4/2008 | Gouk | G03F 7/423 |
| | | | 134/26 |
| 2008/0292856 A1 | 11/2008 | Garner et al. | |
| 2010/0119733 A1* | 5/2010 | Kim | C12Q 1/6834 |
| | | | 427/578 |
| 2011/0023548 A1 | 2/2011 | Garner et al. | |
| 2012/0019767 A1 | 1/2012 | Cadet et al. | |
| 2012/0244358 A1 | 9/2012 | Lock et al. | |
| 2012/0258311 A1 | 10/2012 | Hong et al. | |
| 2013/0065034 A1 | 3/2013 | Muramatsu | |
| 2013/0299077 A1* | 11/2013 | Hong | B82B 3/0076 |
| | | | 156/249 |
| 2015/0210588 A1 | 7/2015 | Chang et al. | |

OTHER PUBLICATIONS

Chang et al; "Bendable Glass Stack Assemblies and Methods of Making the Same"; U.S. Appl. No. 62/039,120, filed Aug. 19, 2014.
Chen et al; "High-quality and efficient transfer of large-area graphene films onto different substrates"; Carbon, 56 (2013) 271-278.
Gross et al; "Bendable Glass Articles With Alkali-Free Glass Elements"; U.S. Appl. No. 62/074,940, filed Nov. 4, 2014.
Gross et al; "Glass Articles With Non-Planar Features and Alkali-Free Glass Elements"; U.S. Appl. No. 62/075,599, filed Nov. 5, 2014.
Kang et al; "Efficient transfer of large-area graphene films onto rigid substrates by hot pressing"; ACSNANO, vol. 6, No. 6, 5360-5365, 2012.
Lee et al; "Bendable Glass Substrate and Methods of Making"; U.S. Appl. No. 61/932,924, filed Jan. 29, 2014.
Unarunotai et al; "Transfer of graphene layers grown on SiC wafers to other substrates and their integration into field effect transistors"; Applied Physics Letters, 95, 202101 (2009).

* cited by examiner

TRANSFER OF MONOLAYER GRAPHENE ONTO FLEXIBLE GLASS SUBSTRATES

This application claims the benefit of priority under 35 U.S.C. §119 of U.S. Provisional Application Ser. No. 62/095,270 filed on Dec. 22, 2014 the content of which is relied upon and incorporated herein by reference in its entirety.

FIELD

Described herein are methods for improved transfer of graphene from formation substrates to flexible glass target substrates. In particular, the methods described herein are useful in the transfer of high-quality chemical vapor deposition-grown monolayers of graphene from metal, e.g., copper, formation substrates to dimensionally and thermally stable targets that offer wide applicability for use in electronics.

TECHNICAL BACKGROUND

Graphene is a two-dimensional monolayer of $sp^2$-bonded carbon atoms that has been attracting great interest following its experimental isolation by the mechanical cleavage of graphite. Its unique physical properties, such as high intrinsic carrier mobility (~200,000 $cm^2/Vs$), quantum electronic transport, tunable band gap, high mechanical strength and elasticity, and superior thermal conductivity, make graphene promising for many applications, including high speed transistors, energy/thermal management, and chemical/biological sensors. As the current generation of silicon-based devices reach their fundamental minimum size limit in the coming years, graphene will provide an opportunity to design even smaller devices. Since graphene remains conductive and stable at the molecular level, it is in a position to provide the next generation of low power electronics.

Since the first isolation of graphene by mechanical exfoliation, various methods have been devised to produce graphene. So far, graphene with the best electronic properties has been synthesized by mechanical exfoliation from Highly Ordered Pyrolytic Graphite (HOPG), which is on the order of tens of micrometers in size. Graphene can also be produced by chemical reduction of graphite oxide, high temperature annealing of single crystal silicon carbide, and chemical vapor deposition (CVD) on metal substrates. These techniques have been employed in demonstrating good quality graphene transistors. However, the only one that has the promise of becoming an inexpensive and manufacturable technology for deposition of reasonably high quality graphene is CVD, which has been one of the most-used thin film fabrication techniques in silicon very-large-scale integration (VLSI). The method mainly involves the adsorption, decomposition and segregation of a carbon-containing precursor on transition metal surface at an elevated temperature either at low or atmospheric pressure, which results in graphene synthesis. In particular, recent developments on uniform single layer deposition of graphene on copper foils over large areas have allowed access to high quality material. However, for the outstanding properties of graphene to be fully utilized, the synthesized graphene must be able to be transferred from the formation substrate to a variety of other target substrates. Particularly, in order for electrical current to flow through graphene devices as opposed to being shorted out by a conducting substrate, graphene must be removed from the conducting catalyst surface and transferred onto an insulating surface.

While a number of processes have been developed to aid in this transfer, there currently remains an unmet need for improved processes to effectively and efficiently transfer graphene to target substrates.

SUMMARY

A first aspect comprises a process A process for forming a graphene-coated glass comprising a. forming a clean ultrathin, flexible glass substrate, comprising: i. applying an $O_2$ plasma treatment to an ultrathin, flexible glass substrate; ii. applying an organic base and peroxide solution to the ultrathin, flexible glass substrate; and iii. applying an acid and peroxide solution to the ultrathin, flexible glass substrate; wherein the ultrathin, flexible glass substrate has a thickness of from about 10 µm to about 300 µm; b. contacting a chemical vapor deposition-grown graphene on a formation substrate with a thermal release tape to form a stack; c. applying a pressing force of from about 100 to about 1000 psi to the stack for time sufficient to adhere the thermal release tape to the graphene, then removing of the pressing force; d. etching away the formation substrate in an etchant solution; e. contacting the clean ultrathin, flexible glass substrate with the graphene to form a sandwich comprising the thermal release tape, graphene, and ultrathin, flexible glass substrate, and placing the sandwich in a press; f. applying a pressing force of from about 75 to about 300 psi to the sandwich for time sufficient to adhere the graphene to the ultrathin, flexible glass substrate, then removing of the pressing force; g. heating the sandwich to a temperature about 1° to about 10° C. above the release temperature of the thermal release tape for a time sufficient to allow for removal of the thermal release tape without damage to the graphene or ultrathin, flexible glass substrate, or removal of the graphene from the ultrathin, flexible glass substrate. The pressing forces may, in some embodiments for the stack, be from about 150 psi to about 800 psi. The pressing forces may, in some embodiments for the sandwich, be from about 100 psi to about 200 psi.

In some embodiments, the process further comprises between steps c. and d., the step of contacting the stack with an acid, in some embodiments, an oxidizing acid, for sufficient time to remove any graphene on the formation substrate not within the stack. In some embodiments, the acid is combined with a peroxide or other oxidizing agent. In some embodiments, the acid comprises nitric acid, sulfuric acid, or hydrochloric acid, or combinations thereof, and further, optionally in combination with a peroxide.

In some embodiments, the process further comprises an additional cleaning step comprising washing the graphene and ultrathin, flexible glass substrate with one or more organic solvents to remove any residual thermal release tape residues. In some embodiments, the solvent comprises methanol, ethanol, toluene, benzene, acetone, or a combination thereof.

In some embodiments, the etchant comprises iron chloride, ammonium persulfate, iron nitrate, copper chloride, copper sulfate, hydrochloric acid, hydroboric acid, nitric acid, sulfuric acid, sodium hydroxide, hydrogen peroxide, chromium oxide, phosphoric acid, or combinations thereof.

In some embodiments, the sandwich is heated to a temperature about 1° to about 5° C. above the release temperature.

In some embodiments, in step a., the organic base is selected from the group of KOH, NaOH, $NH_4OH$, $Ca(OH)_2$ and combinations thereof; the acid is selected from the group of hydrochloric acid, hydroboric acid, nitric acid, sulfuric acid, phosphoric acid, and combinations thereof, and the peroxide is selected from the group of hydrogen peroxide.

A second aspect comprises a process for forming a graphene-coated glass comprising a. forming a clean ultrathin, flexible glass substrate, comprising: i. applying an $O_2$ plasma treatment to an ultrathin, flexible glass substrate; ii. applying an organic base and peroxide solution to the ultrathin, flexible glass substrate; and iii. applying an acid and peroxide solution to the ultrathin, flexible glass substrate; wherein the ultrathin, flexible glass substrate has a thickness of from about 10 µm to about 300 µm; b. coating a chemical vapor deposition-grown graphene with a polymer (e.g., polymethylmethacrylate (PMMA) polymer or a polydimethylsiloxane (PDMS) polymer) at a temperature and for a time sufficient to allow the polymer to polymerize; c. etching away the formation substrate in an etchant solution; d. contacting the clean ultrathin, flexible glass substrate with the graphene to form a stack comprising the polymer, graphene, and ultrathin, flexible glass substrate; and e. dissolving the polymer by contacting the polymer with an organic solvent.

In some embodiments, in step a., the organic base is selected from the group of KOH, NaOH, $NH_4OH$, $Ca(OH)_2$ and combinations thereof; the acid is selected from the group of hydrochloric acid, hydroboric acid, nitric acid, sulfuric acid, phosphoric acid, and combinations thereof; and the peroxide is selected from the group of hydrogen peroxide.

In some embodiments, the process further comprises an additional cleaning step comprising washing the graphene and ultrathin, flexible glass substrate with one or more organic solvents to remove any residual thermal release tape residues, such as methanol, ethanol, toluene, benzene, acetone, or a combination thereof.

The processes described herein are applicable to ultrathin, flexible glass substrates when such substrates are on rolls—useful in roll-to-roll processing, on carrier substrates, or used on their own.

Additional features and advantages will be set forth in the detailed description which follows, and in part will be readily apparent to those skilled in the art from the description or recognized by practicing the embodiments as described in the written description and claims hereof, as well as in the appended drawings.

It is to be understood that both the foregoing general description and the following detailed description are merely exemplary, and are intended to provide an overview or framework for understanding.

BRIEF DESCRIPTION OF THE DRAWINGS

The accompanying drawings are included to provide a further understanding, and are incorporated in and constitute a part of this specification.

DETAILED DESCRIPTION

Before the present materials, articles, and/or methods are disclosed and described, it is to be understood that the aspects described below are not limited to specific compounds, synthetic methods, or uses as such may, of course, vary. It is also to be understood that the terminology used herein is for the purpose of describing particular aspects only and is not intended to be limiting.

In this specification and in the claims that follow, reference will be made to a number of terms that shall be defined to have the following meanings:

Throughout this specification, unless the context requires otherwise, the word "comprise," or variations such as "comprises" or "comprising," will be understood to imply the inclusion of a stated integer or step or group of integers or steps but not the exclusion of any other integer or step or group of integers or steps. Where comprise, or variations thereof, appears the terms "consists essentially of" or "consists of" may be substituted.

As used in the specification and the appended claims, the singular forms "a," "an" and "the" include plural referents unless the context clearly dictates otherwise. Thus, for example, reference to "a pharmaceutical carrier" includes mixtures of two or more such carriers, and the like.

"Optional" or "optionally" means that the subsequently described event or circumstance can or cannot occur, and that the description includes instances where the event or circumstance occurs and instances where it does not.

Ranges may be expressed herein as from "about" one particular value, and/or to "about" another particular value. When such a range is expressed, another aspect includes from the one particular value and/or to the other particular value. Similarly, when values are expressed as approximations, by use of the antecedent "about," it will be understood that the particular value forms another aspect. It will be further understood that the endpoints of each of the ranges are significant both in relation to the other endpoint, and independently of the other endpoint.

The demand for smaller, thinner, lighter, flexible and in some cases, transparent, electronics devices, such as displays, touch sensors, and photovoltaics, continues to increase at a phenomenal rate. Graphene is an ideal candidate for such technologies, as it has high transparency, mechanical flexibility and an electrical conductivity that can be tuned over a wide range from insulator to metal. In fact, graphene is considered as a viable candidate material to replace common transparent conductive oxides, such as indium tin oxide (ITO). In addition to cost constraints, graphene is advantaged over ITO because while ITO is both transparent and conductive, it exhibits poor flexing performance due to microcrack formation.

Graphene, as used herein, incorporates the ordinary meaning of the term and describes pure or nearly pure carbon in a one-atom thick layer where carbon atoms are densely packed in a regular sp2-bonded atomic-scale hexagonal pattern. Graphene-like materials that are also considered herein further include nanoribbons, nanostripes, oxidized forms of graphene, chemically-modified or -substituted graphene, along with ligated or complexed graphene sheets, and multiple layers of any of the above.

Several technologies exist in the prior art related to the transfer of graphene onto flexible polymeric (plastic) substrates such as polyethylene naphtalate (PEN), polyethylene terephthalate (PET), polyethersulfone (PES), polyacrylate (PAR), polycarbonate (PC), polyimide (PI) for fabrication of graphene flexible devices (e.g. U.S. Publ. No. 2013/0065034 A1, U.S. Publ. No. 2012/0244358 A1, WO 2011/046775 A1, U.S. Publ. No. 2012/0258311 A1, WO 2011/081473 A2). However, most polymer substrates have the critical disadvantage of having a great coefficient of thermal expansion (CTE), which subjects them to sharp changes in their dimensions in a high-temperature process above the glass transition temperature (Tg). The large CTEs of polymers may cause problems of deteriorating dimensional stability upon fabricating devices such as TFT on a plastic substrate. Therefore, substrate choice is critical for the overall optimization of flexible electronic device design, fabrication process, and performance.

Glass substrates offer several advantages when compared to polymer substrates, including dimensional and thermal stability, sample purity, transparency, and surface quality. Adding to these benefits, ultra-thin flexible glasses, in the range of 25-150 μm thick, such as Corning Incorporated's Willow® (100-200 μm thick glass sheets) and Phyllo® (<100 μm glass sheet) glasses, enable the use of roll-to-roll (R2R) processing and fabrication of ultra-thin and light weight devices.

For the noted outstanding properties of graphene to be fully utilized, the synthesized graphene must be transferrable to a variety of substrates, both conducting and non-conducting. As noted above, various methods have been developed to transfer graphene onto different substrates. Currently, the most commonly used transfer methods rely on polymer-assisted transfer processes, in which a polymer layer such as polymethyl methacrylate (PMMA), polydimethylsiloxane (PDMS) or thermal released tape (TRT) is used as temporary rigid support to maintain the graphene film integrity and to prevent folding, tear and wrinkles while the growth substrate (Cu, Ni) is chemically etched. In general, polymer-assisted transfer methods have the advantages of easy handling and processing.

Aspects described herein overcome many of the aforementioned problems by unexpectedly showing that conventional transfer methods (i.e., PMMA and TRT transfer methods) can be used to transfer high quality, continuous monolayer films of graphene from CVD-grown monolayer graphene on metal foil to ultra-cleaned ultrathin glass substrates, such as Corning Incorporated's Willow® and Phyllo® glass substrates. The resulting graphene films can be used in any number of applications, such as for fabrication of large-area display, touch panel devices and smart windows.

A first aspect comprises a method of transferring CVD formed graphene from the formation substrate, typically a metal substrate, such as copper, to the target substrate. The transfer process comprises one or more of the steps of: i) forming a graphene layer on a formation substrate by CVD; ii) applying an ultra-clean treatment to the glass target surface to enhance the adhesion (i.e. van der Walls) between the graphene and the glass target; and iii) transferring graphene from the formation substrate to the cleaned glass target using the appropriate transfer technique, such as the PMMA and TRT transfer methods. The ultra-clean surface treatment is applied to remove contaminants from the glass surface to create strong van der Waals interaction between the glass surface and the transferred graphene.

Target substrates that may be used with the processes and methods described herein include generally include any thin glass substrate having the necessary properties to adequately adhere graphene under the processes described herein. In particular, Corning Incorporated's Willow® and Phyllo® ultrathin glasses are highly advantageous. The properties of these glasses may be found, for example, in U.S. Publ. Nos. 2008/0292856 and 2011/0023548, and U.S. Prov. Appl. Nos. 61/932,924, 61/974,732, 62/039,120, 62/075,599, and 62/074,940, all of which are herein incorporated by reference in their entireties. Other ultrathin glasses include, but are not limited to, NEG's G-Leaf™ (35 μm), Schott's ultrathin (25 and 100 μm) AF 32 and D 263 T eco glasses, and Asahi's ultrathin (~100 μm) glass product. As noted above, the combination of a graphene layer on a flexible glass substrate has a number of unexpected advantages—flexible glass (such as Corning Incorporated's Willow® and Phyllo®) substrates offer advantages in flexibility, dimensional and thermal stability, transparency, and surface quality when compared to alternative substrate materials, such as plastics and metals. The combination of these properties with the exceptional properties of graphene allow for the design and development of a comprehensive technological platform for the fabrication of many flexible electronic devices. Further, many of the advantages listed above may also be useful in applications using other glass substrates, such as Gorilla® Glass. In some embodiments, the dimensional and thermal stability, transparency, and surface quality of other advanced glass compositions can be used in combination with the graphene structures formed by the processes described herein to develop new material combinations that impart additional scratch and damage resistance to the glass substrate.

The monolayer graphene film is transferred from CVD grown graphene on a metal formation substrate (e.g., copper) using a suitable transfer method such as PMMA and the TRT methods. Formation substrates that may be used in the methods described herein include all those known in the art. Copper is used as an example substrate throughout the description, but other substrate materials are acceptable and considered herein as well, such as nickel, steel, etc.

The subsequent transfer process relies on two distinct steps. In the first step, the glass substrate is ultra-cleaned to enhance its adhesion to graphene. In the second step, a monolayer graphene grown on copper by CVD is transferred to an ultra-cleaned glass using a suitable transfer method as exemplified above. Each step is described in detail below.

Critical factors that ensure a successful graphene transfer onto the target substrate include the substrate's hydrophobicity and the contact between the target substrate and graphene. In order to improve the adhesion strength between the transferred graphene and the glass surface, a cleaning and surface treatment procedure is used to remove contaminants present on the surface. The cleaning and surface treatment procedure presented here is used to produce clean and hydrophilic surface on glass for graphene transfer. The glass surface is cleaned using the following surface treatment protocol having four principle steps. First, the glass surface is cleaned using a $O_2$ plasma treatment, followed by cleaning the glass with a cleaner comprising a peroxide in a basic aqueous solution, then a cleaner comprising a peroxide in an acidic aqueous solution, and ending with ultrasonic rinsing in deionized water. In some embodiments, it is advantageous to add the additional step of treating the glass for a short period of time with $O_2$ plasma just prior to graphene transfer.

Regarding the first step, the $O_2$ plasma treatment is done at a power sufficient to generate a plasma that actively and efficiently cleans the target surface in a reasonable time period, but does not damage the surface. In some embodiments, the $O_2$ plasma treatment is done at a power from about 100 W to about 1500 W. In some embodiments, the $O_2$ plasma treatment is done at a power from about 300 W to about 1000 W. In some embodiments, the $O_2$ plasma treatment is done at a power from about 500 W to about 900 W. Typical cleaning durations are on the order of minutes. In some embodiments, the target is cleaned via $O_2$ plasma treatment for from about 1 min to about 30 mins. In some embodiments, $O_2$ plasma treatment is from about 2 mins to about 10 mins. In some embodiments, $O_2$ plasma treatment is from about 2 mins to about 5 mins.

The second step involves cleaning the glass target with a peroxide in an basic aqueous solution. The solution may have a pH from about 8 to about 14. The peroxide may be selected from the group of peroxides miscible in water, such as hydrogen peroxide, organic hydroperoxides, and organic peroxides. Due to its availability, hydrogen peroxide is most convenient to use, often obtained in aqueous solutions with a concentration of about 30%, and in some industrial cases in concentrations of 70% to 98%. Typical formulations of the second step cleaning solution use from about 10:1 to about 1:1 water to peroxide. Bases that can be used in the second step include inorganic and organic bases that are water soluble. Typical bases include salts or aqueous solutions (concentrated or diluted) of bases like $Ca(OH)_2$, NaOH or KOH, as well as bases such as $NH_4OH$, and the like. Base concentrations can be varied as necessary to obtain the proper pH or can be from 10:1 to about 1:1 water to base where appropriate.

Figure 1:
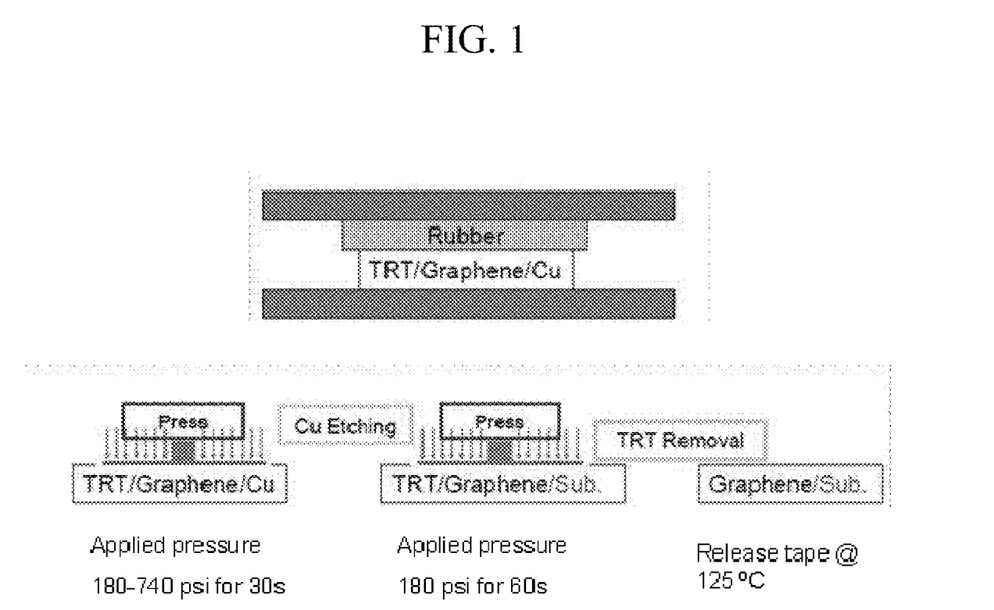
FIG. 1 is a schematic illustration of the TRT transfer process embodied herein where a CVD-grown monolayer of graphene is transferred onto a thin, flexible glass substrate.

FIG. 1 shows a schematic of the TRT transfer process. Graphene on a copper formation substrate is first flattened between two cleaned glass slides. A pre-cut piece of thermal release tape (TRT) is placed on top of the graphene surface. The tape/graphene/copper sample 'stack' is then placed into a press and sandwiched between two steel plates. Pressure, from about 150 to about 1000 psi is applied to the stack for sufficient time to transfer or adhere the substrate, typically on the order of tens of seconds to minutes (e.g., ~30 s). After this, the sample stack is removed from the press and the graphene at the backside of the copper is removed by $O_2$ plasma treatment or by dipping in an organic acid (e.g., ~10 wt % nitric acid) for a time period sufficient to cause removal (on the order of tens of seconds to minutes, e.g., ~2 min) Acids that may be used include organic acids, in particular oxidizing acids or organic acids in combination combined with a peroxide or other oxidizing agent. In some embodiments, the acid comprises nitric acid, sulfuric acid, or hydrochloric acid, or combinations thereof, and further, optionally in combination with a peroxide. The copper foil is then etched with an etchant (e.g., 1.0 M $FeCl_3$ solution) at a temperature and time that allows for efficient etching (e.g., ~60° C. for ~30 min). Etchants include, but are not limited to, iron chloride, ammonium persulfate, iron nitrate, copper chloride, copper sulfate, hydrochloric acid, hydroboric acid, nitric acid, sulfuric acid, sodium hydroxide, hydrogen peroxide, chromium oxide, phosphoric acid, or combinations thereof. The tape with the graphene is placed on a glass sample and then returned to the press, where from about 150 to about 250 psi is applied for sufficient time (in some embodiments, from ~30 s to ~5 min) to transfer or adhere the substrate to the glass sample. The stack is then decompressed and left on the lower plate where the surface temperature is stabilized at a temperature greater than the release temperature of the tape. The thermal release temperature of the tape is dependent on the tape used—thermal release tapes are known in the art and have release temperatures of about 90° C., 120° C., 125° C., 150° C., 170° C., etc. (e.g., Revalpha by Nitto Denka Corp.). In some embodiments, the stabilized temperature is from about 1° C. to about 10° C. above release temperature of the tape. In some embodiments, the stabilized temperature is from about 1° C. to about 3° C. or about 1° C. to about 2° C. above release temperature of the tape. This thermal treatment eliminates the adhesion strength of the tape. The tape is removed, leaving behind the transferred graphene film on the glass substrate. The tape residue on the graphene surface is removed via an organic solvent—in some embodiments, the solvent comprises one or more of methanol, toluene, or acetone, or it may comprise a mixture (e.g., in some embodiments, a 1:1:1 by volume), of these solvents. Finally, the graphene is baked under vacuum at a time and temperature sufficient to promote adhesion. In some embodiments, the graphene is baked at from about 100° to about 400° C. for from about 10 min to about 4 hours. In some embodiments, the graphene is baked at from about 150° to about 300° C., about 175° to about 250° C., or about 200° to about 225° C. for from about 10 min to about 4 hours, about 30 min to about 3 hours, about 15 min to about 2 hours, or about 1 hour to about 1.5 hours to promote adhesion.

Figure 2:
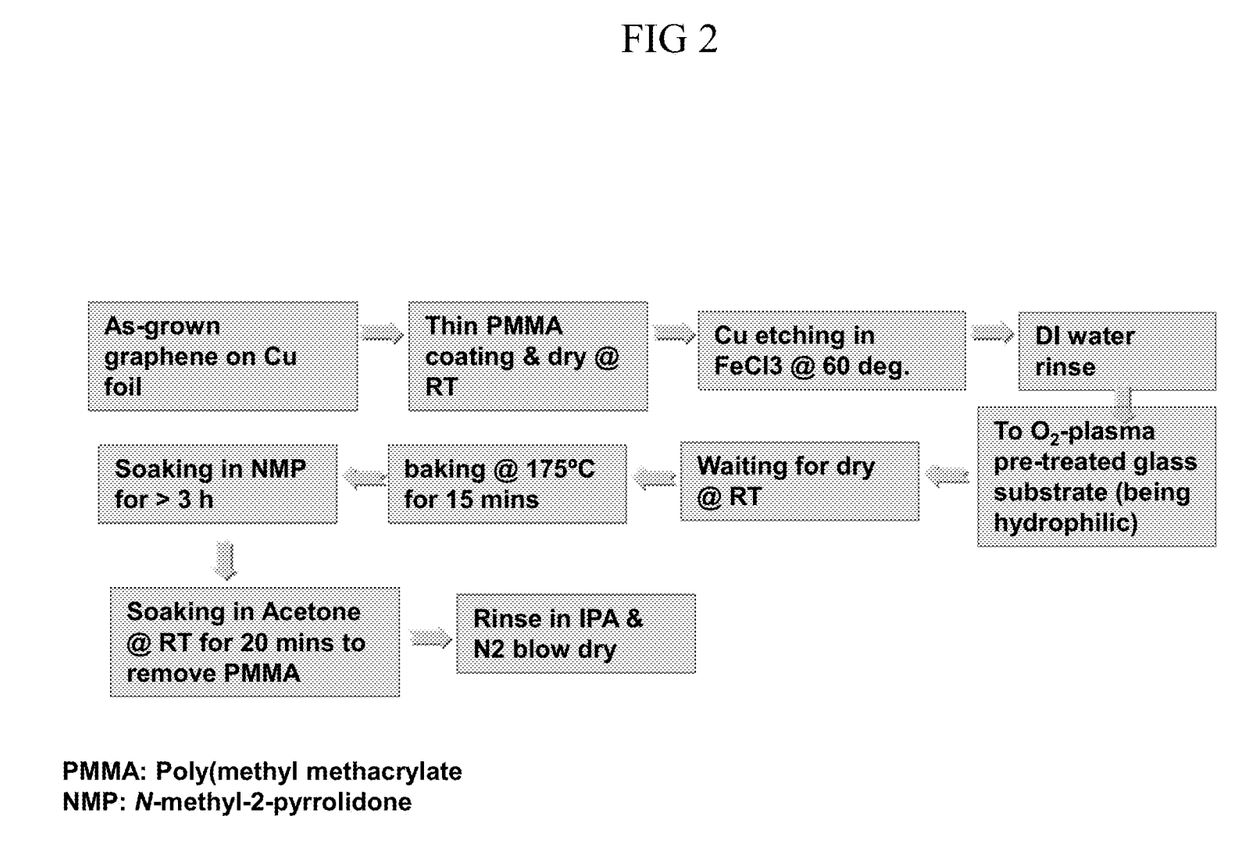
FIG. 2 describes the PMMA method embodied herein for transferring a CVD-grown monolayer of graphene onto an thin, flexible glass substrate.

FIG. 2 shows a schematic of the polymethylmethacrylate (PMMA) transfer process. Graphene on copper formation substrate is first flattened between two cleaned glass slides. Then PMMA is deposited on a graphene layer and cured at a temperature and time sufficient to polymerize the polymer (e.g., ~115° C. for ~2 min). The graphene-PMMA stack is then removed from the copper foil by etching away the copper as described above. The graphene-PMMA stack is rinsed in deionized water and then lifted from the solution and placed onto the glass substrate. Finally, the PMMA is dissolved using an organic solvent, such as acetone, and then, to remove residue, the graphene is rinsed in an organic solvent—in some embodiments, the solvent mixture comprises one or more of methanol, toluene, or acetone, or it may comprise a mixture (e.g., in some embodiments, a 1:1:1 by volume), of these solvents. in methanol-toluene-acetone mixture.

Figure 3:
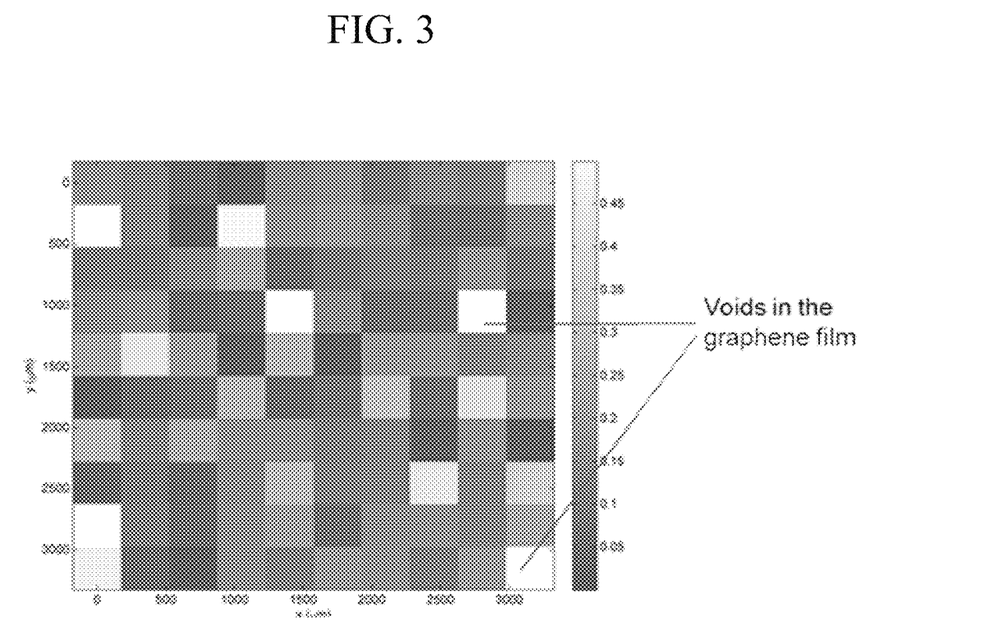
FIG. 3 is a Raman mapping image typical of graphene transferred onto a thin glass sample (Willow®, Corning Incorporated) using either of the TRT or PMMA methods embodied herein. The map shows the graphene film is largely continuous with a transfer efficiency of ~90%.
Figure 4:
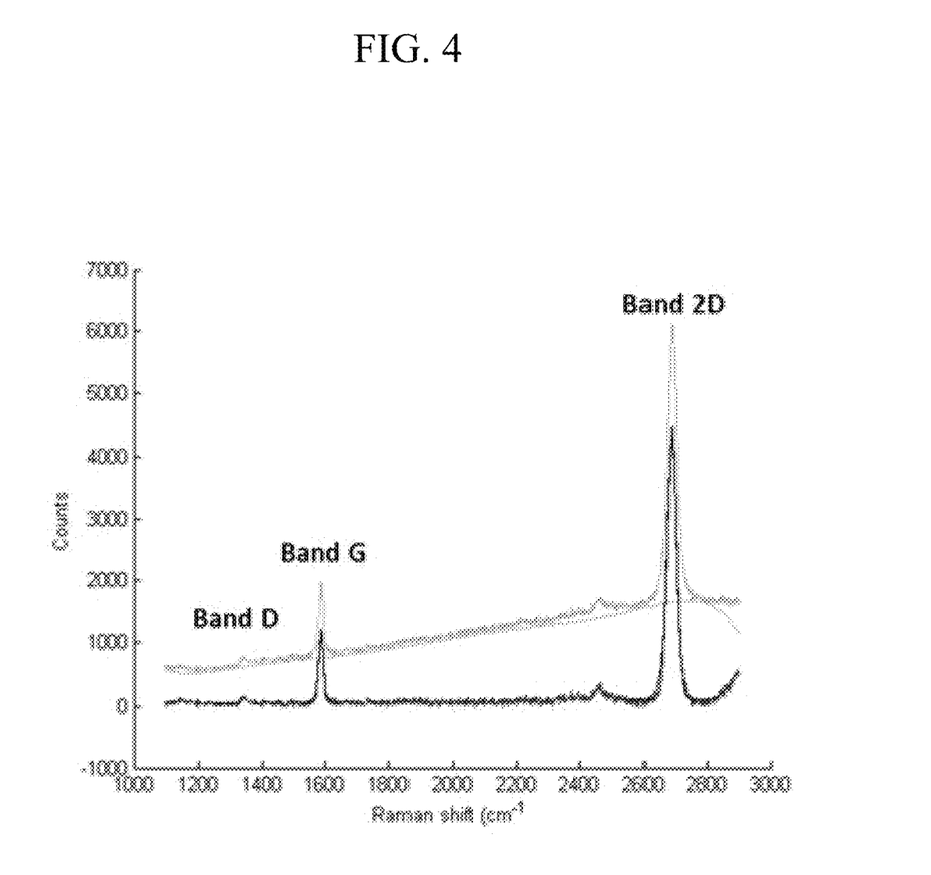
FIG. 4 is a Raman spectrum typical of the monolayer graphene grown on a copper foil and transferred onto Willow® glass samples using either the embodied TRT or PMMA method. The low intensity D band across the domain indicates that the film has low defect density.

The transferred graphene films were characterized by Raman spectroscopy and four-point probe to respectively determine their quality and uniformity and sheet resistance. One example is shown in FIG. 3 and FIG. 4 (process detailed in Comparative Example 2, below). FIG. 3 shows a Raman mapping image of G/2D intensity ratio. The graphene coverage is ~90%. FIG. 4 is the corresponding spectrum of the monolayer graphene film on Willow® glass transferred by PMMA method. The low intensity D band across the domain indicates that the film has low defect density. The results show that largely continuous, monolayer graphene films with low defect density are transferred to both the Willow® and Phyllo® glass samples. Based on these results, it is envisioned that the transfer process, if optimized and scaled up, would be particularly useful for fabrication in R2R processes on ultrathin flexible glass substrates for use in large-area graphene-based display and touch panel devices.

EXAMPLES

The following examples are provided without intending to limit any aspects of the embodiments described herein.

Figure 5:
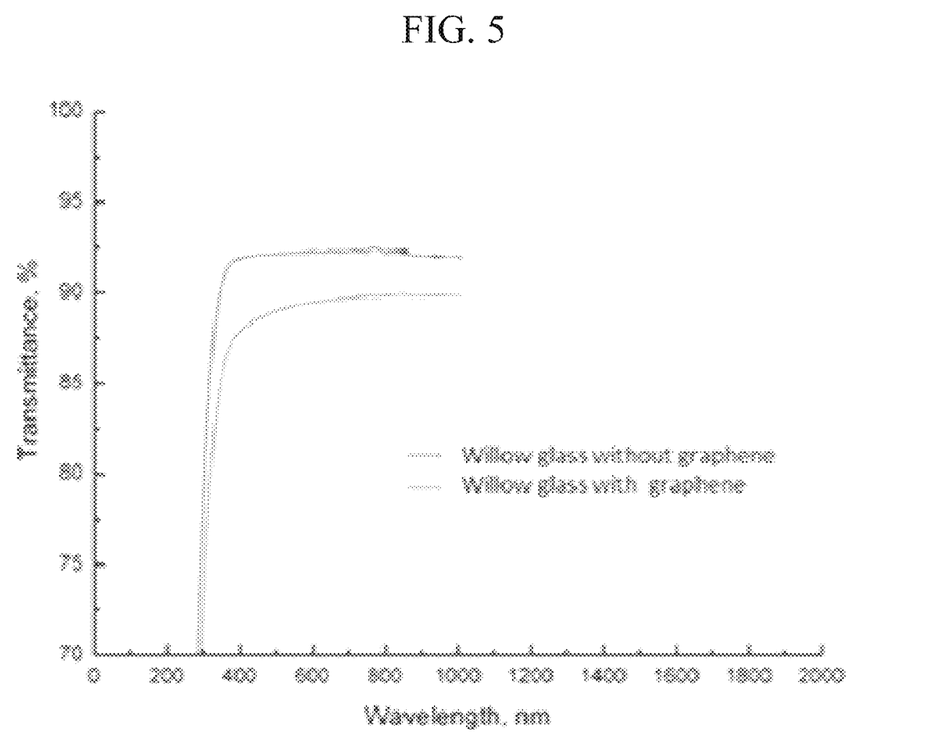
FIG. 5 Optical transmittance spectrum of Willow® glass sample with and without a graphene film. The measured visible transmittance of the glass with and without graphene was ~90% and ~92.3%, respectively, which confirms a monolayer graphene (since a monolayer graphene has an absorbance of about 2.3%).
Figure 6:
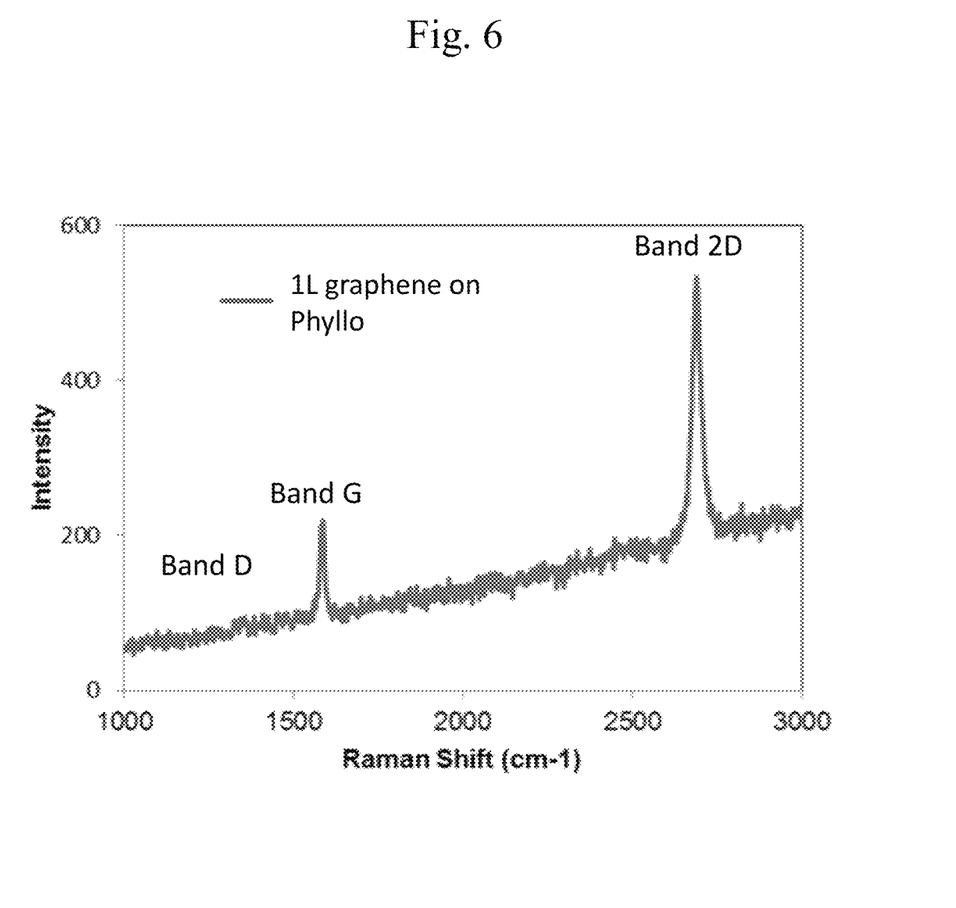
FIG. 6 is a Raman spectrum typical of a monolayer of graphene grown on copper foil and transferred onto Phyllo® glass samples using the TRT method. The low intensity D band indicates that the film has low defect density.

Example 1: Transfer of Monolayer Graphene onto Willow® Glass Using the TRT Method Willow® glass samples 25.4×25.4 mm×150 µm thick are used for the transfer. A CVD-grown monolayer of graphene on copper is obtained from Graphenea, Spain and is used as received. The Willow® samples are cleaned according to the surface cleaning procedure described above. The graphene transfer is carried in a clean room using the TRT-method described above. The transferred films are characterized by Raman spectroscopy, UV-vis spectrophotometry and four point probe measurements to, respectively, determine the continuity and quality, optical transmittance, and sheet resistance of the films. The results show that the transferred graphene is a continuous monolayer film with low defect density and good transmittance (see FIGS. 3-5). The properties of the transferred film are presented in Table 1.

TABLE 1

| Sample ID | Sample Description | Film Coverage | Disorder/defect level, *$I_D/I_G$ (avg.) | Sheet resistance KΩ/sq | Visible Transmittance (%) |
|---|---|---|---|---|---|
| WILLOW-PMMA | Graphene transferred onto Willow using the PMMA method | Films are largely continuous (>90%) | <0.1 Films are less defective | 0.5-1.5 | ~90 |
| WILLOW-HOT-P | Graphene transferred onto Willow using the hot pressing method | | | 1.4-2.0 | |
| PHYLLO-HOP-P | Graphene transferred onto Phyllo using the hot pressing method | ~80 | | N/A | ~89 |

*$I_D/I_G$: The intensity ratio Raman "D" and "G" peaks, is commonly used to characterize disorder in graphene.
The smaller the ratio, the smaller the number of defects in the graphene film.

Example 2: Transfer of Monolayer Graphene onto Willow® Glass by PMMA Method

In Example 2, the glass substrate, the graphene source and the glass pre-cleaning procedure are the same as in Example 1. However, the graphene films are transferred onto the Willow® samples via the PMMA method described above. The transferred films are characterized in the same manner as in Example 1. The properties of the transferred graphene are largely the same as in Example 1 (see Table 1).

Example 3: Transfer of Monolayer Graphene onto Phyllo® Glass Using the TRT Method In Example 3, Phyllo® glass samples 25.4 mm×25.4 mm×25 µm thick are used for the transfer. The graphene on copper samples are obtained from the Institute of Photonic Sciences (ICFO), Spain. The glass pre-cleaning and transfer procedure as well as characterization of the transferred films are the same as in Example 1. The graphene film coverage and the measured transmittance are about 80% and 89%, respectively (Table 1).

Although the embodiments herein have been described with reference to particular aspects and features, it is to be understood that these embodiments are merely illustrative of desired principles and applications. It is therefore to be understood that numerous modifications may be made to the illustrative embodiments and that other arrangements may be devised without departing from the spirit and scope of the appended claims.

What is claimed is:

1. A process for forming a graphene-coated glass comprising:
   a. forming a clean ultrathin, flexible glass substrate, comprising:
      i. applying an $O_2$ plasma treatment to an ultrathin, flexible glass substrate;
      ii. applying an organic base and peroxide solution to the ultrathin, flexible glass substrate; and
      iii. applying an acid and peroxide solution to the ultrathin, flexible glass substrate;
   wherein the ultrathin, flexible glass substrate has a thickness of from about 10 µm to about 300 µm;
   b. contacting a chemical vapor deposition-grown graphene on a formation substrate with a thermal release tape to form a stack;
   c. applying a pressing force of from about 100 to about 1000 psi to the stack to adhere the thermal release tape to the graphene, then removing of the pressing force;
   d. etching away the formation substrate in an etchant solution;
   e. contacting the clean ultrathin, flexible glass substrate with the graphene to form a sandwich comprising the thermal release tape, graphene, and ultrathin, flexible glass substrate, and placing the sandwich in a press;
   f. applying a pressing force of from about 75 to about 300 psi to the sandwich to adhere the graphene to the ultrathin, flexible glass substrate, then removing of the pressing force; and
   g. heating the sandwich to a temperature about 1° to about 10° C. above the release temperature of the thermal release tape to remove the thermal release tape without damage to the graphene or ultrathin, flexible glass substrate, or removal of the graphene from the ultrathin, flexible glass substrate.

2. The process of claim 1, wherein the process further comprises between steps c. and d., the step of contacting the stack with an acid to remove any graphene on the formation substrate not within the stack.

3. The process of claim 1, wherein the acid comprises nitric acid, sulfuric acid, or hydrochloric acid, or combinations thereof.

4. The process of claim 1, wherein the process further comprises an additional cleaning step comprising washing the graphene and ultrathin, flexible glass substrate with one or more organic solvents to remove any residual thermal release tape residues.

5. The process of claim 1, wherein the solvent comprises methanol, ethanol, toluene, benzene, acetone, or a combination thereof.

6. The process of claim 1, wherein the etchant comprises iron chloride, ammonium persulfate, iron nitrate, copper chloride, copper sulfate, hydrochloric acid, hydroboric acid, nitric acid, sulfuric acid, sodium hydroxide, hydrogen peroxide, chromium oxide, phosphoric acid, or combinations thereof.

7. The process of claim 1, wherein the pressing force on the stack is from about 150 psi to about 800 psi.

8. The process of claim 1, wherein the pressing force on the sandwich is from about 100 to about 200 psi.

9. The process of claim 1, wherein the sandwich is heated to a temperature about 1 o to about 5° C. above the release temperature.

10. The process of claim 1, wherein in step a., the organic base is selected from the group of KOH, NH$_4$OH, NaOH, Ca(OH)$_2$ and combinations thereof; the acid is selected from the group of hydrochloric acid, hydroboric acid, nitric acid, sulfuric acid, phosphoric acid, and combinations thereof; and the peroxide is selected from the group of hydrogen peroxide.

11. The process of claim 1, wherein the ultrathin, flexible glass substrate is on a roll.

12. The process of claim 1, wherein the ultrathin, flexible glass substrate is supported on a second substrate, thicker substrate.

13. A process for forming a graphene-coated glass comprising:
   a. forming a clean ultrathin, flexible glass substrate, comprising:
      i. applying an O$_2$ plasma treatment to an ultrathin, flexible glass substrate;
      ii. applying an organic base and peroxide solution to the ultrathin, flexible glass substrate; and
      iii. applying an acid and peroxide solution to the ultrathin, flexible glass substrate;
   wherein the ultrathin, flexible glass substrate has a thickness of from about 10 μm to about 300 μm;
   b. coating a chemical vapor deposition-grown graphene with a polymer and polymerizing the polymer;
   c. contacting the clean ultrathin, flexible glass substrate with the graphene to form a stack comprising the polymer, graphene, and ultrathin, flexible glass substrate; and
   d. dissolving the polymer by contacting the polymer with an organic solvent.

14. The process of claim 13, wherein the polymer comprises a polymethylmethacrylate (PMMA) or polydimethylsiloxane (PDMS).

15. The process of claim 13, wherein in step a., the organic base is selected from the group of KOH, NIL$_4$OH, NaOH, Ca(OH)$_2$ and combinations thereof; the acid is selected from the group of hydrochloric acid, hydroboric acid, nitric acid, sulfuric acid, phosphoric acid, and combinations thereof; and the peroxide is selected from the group of hydrogen peroxide.

16. The process of claim 13, wherein the process further comprises an additional cleaning step comprising washing the graphene and ultrathin, flexible glass substrate with one or more organic solvents to remove any residual thermal release tape residues.

17. The process of claim 13, wherein the solvent comprises methanol, ethanol, toluene, benzene, acetone, or a combination thereof.

18. The process of claim 13, wherein the ultrathin, flexible glass substrate is on a roll.

19. The process of claim 13, wherein the ultrathin, flexible glass substrate is supported on a second substrate, thicker substrate.

20. The process of claim 1, wherein the O$_2$ plasma treatment is applied before the organic base and peroxide solution is applied, and the organic base and peroxide solution is applied before the acid and peroxide solution is applied.

* * * * *

UNITED STATES PATENT AND TRADEMARK OFFICE
CERTIFICATE OF CORRECTION

PATENT NO. : 9,828,285 B2
APPLICATION NO. : 14/971163
DATED : November 28, 2017
INVENTOR(S) : Benedict Yorke Johnson et al.

It is certified that error appears in the above-identified patent and that said Letters Patent is hereby corrected as shown below:

On the Title Page

On the page 2, in Column 2, item [56], Line 12, delete "ACSNANO," and insert -- ACS NANO, --.

In the Claims

In Column 11, Line 18, in Claim 9, delete "1 o" and insert -- 1° --.

In Column 11, Line 21, in Claim 10, delete "NH$_4$0H," and insert -- NH$_4$OH, --.

In Column 12, Line 16, in Claim 15, delete "NIL$_4$OH," and insert -- NH$_4$OH, --.

Signed and Sealed this
Seventh Day of January, 2025

Derrick Brent
*Acting Director of the United States Patent and Trademark Office*